(12) United States Patent
Engel

(10) Patent No.: US 7,284,126 B2
(45) Date of Patent: Oct. 16, 2007

(54) DEVICE AUTHENTICATION USING PRE-CONFIGURED SECURITY KEYS

(75) Inventor: Glenn R. Engel, Snohomish, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 793 days.

(21) Appl. No.: 10/292,019

(22) Filed: Nov. 12, 2002

(65) Prior Publication Data

US 2004/0093495 A1    May 13, 2004

(51) Int. Cl.
  *H04L 9/00* (2006.01)
  *H04K 1/00* (2006.01)
  *G06F 7/04* (2006.01)
(52) U.S. Cl. .................... 713/168; 713/194; 705/56
(58) Field of Classification Search ............. 713/168, 713/170, 171, 176
  See application file for complete search history.

(56) References Cited

U.S. PATENT DOCUMENTS 5,237,611 A    8/1993 Rasmussen et al.
6,118,870 A    9/2000 Boyle et al.
6,782,474 B1*  8/2004 Ylonen .................... 713/162
6,983,368 B2*  1/2006 Wheeler et al. ........... 713/170
2002/0150243 A1* 10/2002 Craft et al. ................ 380/201
2002/0194477 A1* 12/2002 Arakawa et al. ........... 713/170
2003/0172286 A1*  9/2003 Gotoh et al. ............... 713/193

FOREIGN PATENT DOCUMENTS

EP    0 939 514    2/1999

OTHER PUBLICATIONS

European Search Report dated Feb. 19, 2004—1 Page.

* cited by examiner

*Primary Examiner*—Christopher Revak

(57) ABSTRACT

Techniques that enable devices in a network environment to automatically obtain authentication without specialized human intervention during device deployment include a device having a pre-configured security key which a service facility uses to authenticate the device. These techniques enable a service facility to associate pre-configured security keys to owners/users of devices, and enable devices to be purchased without any custom configuration, and enable devices to be attached to a network and automatically obtain authentication and configuration based on the identity of the owner of the devices.

21 Claims, 4 Drawing Sheets

DEVICE AUTHENTICATION USING PRE-CONFIGURED SECURITY KEYS

BACKGROUND OF THE INVENTION

1. Field of Invention

The present invention pertains to the field of device authentication. More particularly, this invention relates to device authentication using preconfigured security keys.

2. Art Background

A wide variety of devices may be employed in a network communication environment. For example, measurement devices may be placed in locations where measurements are desired and a communication network may be used to report obtained measurements to an information recording facility. Similarly, actuator/control devices may be placed in desired locations and a communication network may be used to carry control information to/from the devices.

It is usually desirable in a network environment to provide mechanisms that enable authentication of devices with respect to their owners/users. For example, it is common for the owner/user of a measurement device to subscribe to a data logging service provided by an information recording facility. In such a system, it is desirable to provide the information recording facility with a capability to authenticate the fact that a measurement device is associated with a user/owner that subscribes to the services of the information recording facility.

In addition, it is usually desirable in a network environment to provide secure communication for devices. Secure communication may prevent, for example, unauthorized parties from obtaining data from a measurement device or prevent unauthorized parties from providing control information to actuator/control devices.

Prior techniques for enabling authentication and secure communication for devices in a network usually include human intervention. For example, it is common for a field installer to configure a measurement device with a security key at its installation site. The security key may then be used by an information recording facility to authenticate messages from the measurement device and decrypt data that is encrypted with the security key. Unfortunately, such techniques that involve human intervention usually increase the costs of device installation. Such costs are magnified in applications that involve large numbers of devices connected to an open network.

SUMMARY OF THE INVENTION

Techniques are disclosed that enable devices in a network environment to automatically obtain authentication without specialized human intervention during device deployment. A device according to the present techniques includes a pre-configured security key which a service facility uses to authenticate the device. Techniques are disclosed for enabling a service facility to associate pre-configured security keys to owners/users of devices, and for enabling devices to be purchased without any custom configuration, and for enabling devices to be attached to a network and automatically obtain authentication and configuration based on the identity of the owner of the devices.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
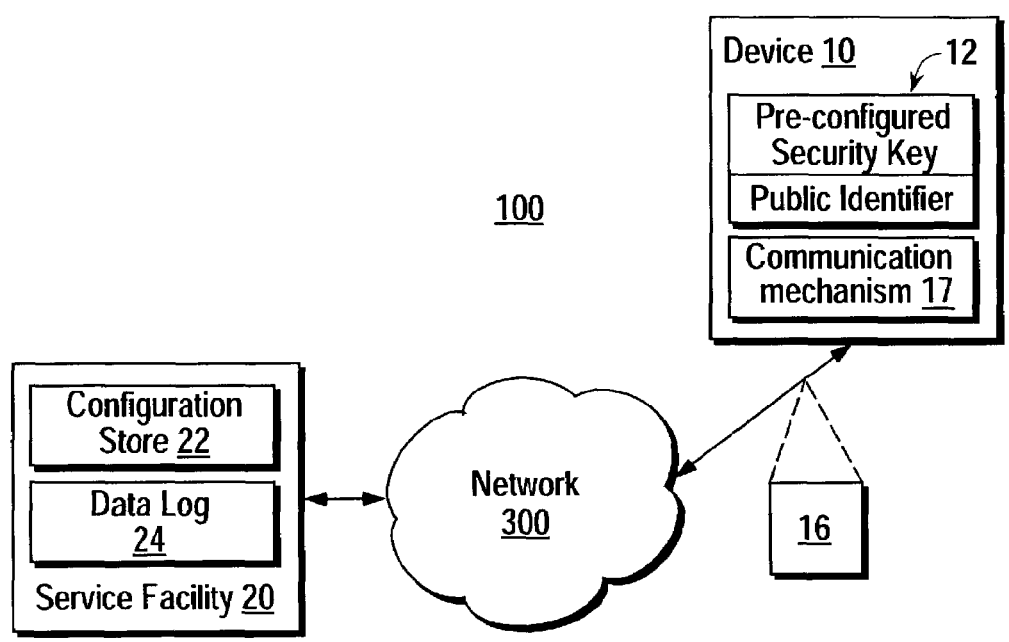
FIG. 1 shows a system according to the present techniques.

FIG. 1 shows a system 100 according to the present techniques. The system 100 includes a service facility 20 and a device 10 which communicate via a network 300. A user/owner of the device 10 subscribes to services associated with the device 10 that are provided by the service facility 20. The service facility 20 includes a data log 24 for holding information associated with authenticated devices.

The device 10 includes a communication mechanism 17 that enables communication via the network 300 and that generates digital signatures, authentication messages, message encryption, etc, in accordance with the present teachings. The communication mechanism 17 may be implemented as a combination of hardware and code and provides the appropriate functions for communication on the network 300 using, for example, web protocols.

In one embodiment, the device 10 is a measurement device and the service facility provides a data logging service for the measurements generated by the device 10. Examples of measurement devices are numerous and include digital cameras, temperature sensor, pressure sensors, chemical sensors, motion sensors, electrical signal sensors, and other types of devices capable of rendering digital measurements. The service facility 20 may embody a server that communicates via the network 300 using HTTP protocols and the device 10 may include HTTP client or server capabilities.

The device 10 includes a persistent memory 12 that holds a pre-configured security key. The preconfigured security key may be programmed into the device 10 by a provider of the device 10. The provider of the device 10 may be a manufacturer or some other entity that ultimately provides the device 10 to a user/owner. The persistent memory 12 may be any type of persistent memory. Examples are numerous and include registers, read-only memory, non-volatile RAM, etc, solid-state memory including magnetic memory, etc.

The persistent memory 12 also holds a public identifier for the device 10. One example of a public identifier is a manufacturer's serial number. Another example of a public identifier is a MAC address used in communication. In many embodiments, the fact that the pre-configured security key of the device 10 is programmed into the same pre-existing persistent memory which holds other information such as a public identifier for the device 10 means that providing the pre-configured security key does not add substantial costs or extra steps during manufacture of the device 10.

A user/owner deploys the device 10 by placing it in a desired location and connecting it to the network 300. The device 10 then automatically authenticates itself to the service facility 20 using the pre-configured security key in the persistent memory 12. This eliminates the need for install/service personnel to travel to the site of installation of the device 10 to configure security keys.

In one embodiment, the device 10 authenticates itself to the service facility 20 by generating an authentication message 16 using the pre-configured security key contained in the persistent memory 12. The service facility 20 obtains the authentication message 16 via the network 300 and uses it to verify the authenticity of the device 10. For example, the authentication message 16 may include a digital signature which is generated using the pre-configured security key and the public identifier from the persistent memory 12. The service facility 20 obtains the authentication message 16 and determines whether the device 10 is authentic by verifying the digital signature.

The service facility 20 includes a configuration store 22 that holds a set of entries, each entry associating a security key to a corresponding authentic device. For example, one entry in the configuration store 22 may include the value of the pre-configured security key and the value of its corresponding public identifier of the device 10. The service facility 20 receives the authentication message 16 via the network 300, uses the clear text of the public identifier which is carried in the authentication message 16 to lookup and obtain a security key from the configuration store 22. If a security key corresponding to the public identifier carried in the authentication message 16 is present in the configuration store 22 then the service facility 20 uses that security key to verify the digital signature of the authentication message 16.

For example, the device 10 may generate the digital signature for the authentication message 16 by computing a hash of the public identifier from the persistent memory 12 and then applying the preconfigured security key from the persistent memory 12 to that result. In response, the service facility 20 may authenticate the device 10 by applying the same hash function to the public identifier carried in the authentication message 16 and then use the corresponding security key obtained from the configuration store 22 to determine whether that hash result corresponds to the digital signature carried in the authentication message 16. In this example, the public identifier 14 is carried in clear text in the authentication message 16.

The pre-configured security key contained in the persistent memory 12 and the information in the configuration store 22 also enable secure communication between the device 10 and the service facility 20. For example, the device 10 may encrypt data using the pre-configured security key from the persistent memory 12 and transfer it to the service facility 20. In response, the service facility 20 uses a security key for the device 10 obtained from the configuration store 22 to decrypt the data from the device 10.

In some embodiments, the pre-configured security key in the persistent memory 12 is a private key. In other embodiments, the pre-configured security key in the persistent memory 12 may include a public key and a private key.

Figure 2:
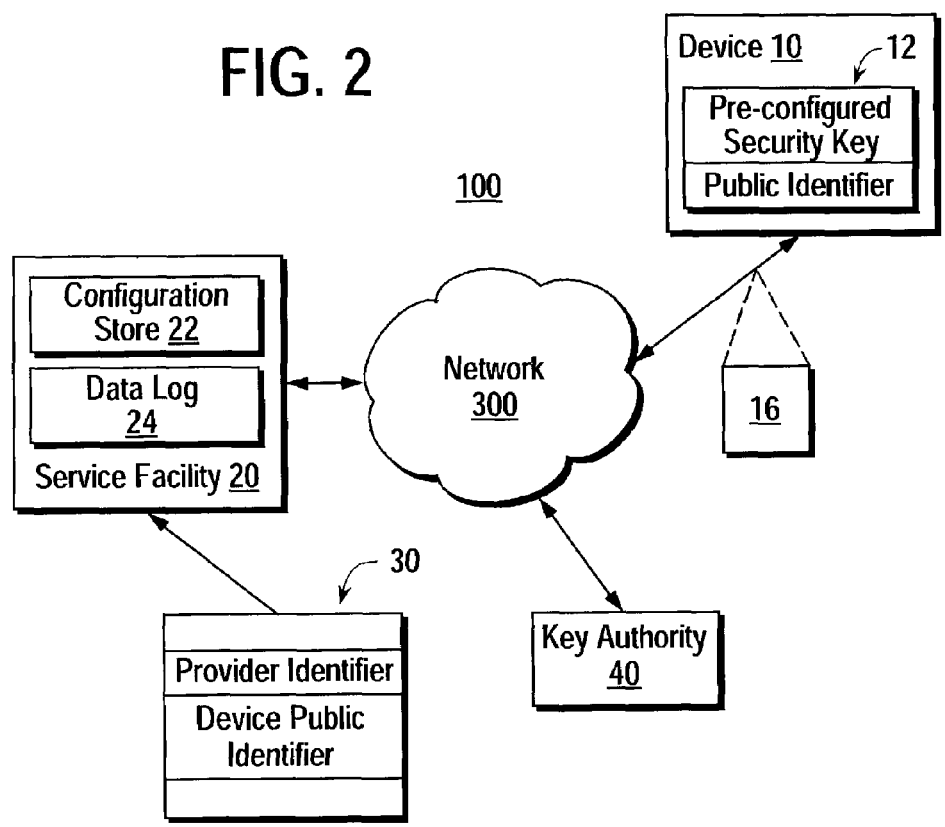
FIG. 2 shows a system according to the present techniques which includes a key authority that provides security keys and corresponding public identifiers.

FIG. 2 shows an embodiment of the system 100 which includes a key authority 40 that provides the service facility 20 with the information for its configuration store 22 of security keys and corresponding public identifiers. The key authority 40 may, for example, be the manufacturer of the device 10 or a service provider from which an owner/user obtains the device 10 to name a couple of examples.

A user/owner of the device 10 obtains the services of the service facility 20 by generating a user message 30 that includes a device public identifier for the device 10 and a provider identifier that identifies the key authority 40. In response to the user message 30, the service facility 20 obtains the security key for the device 10 from the key authority 40 using a secure channel of communication between the service facility 20 and the key authority 40. The obtained security key and corresponding public identifier are then recorded in the configuration store 22 for use when authenticating the device 10.

Figure 3:
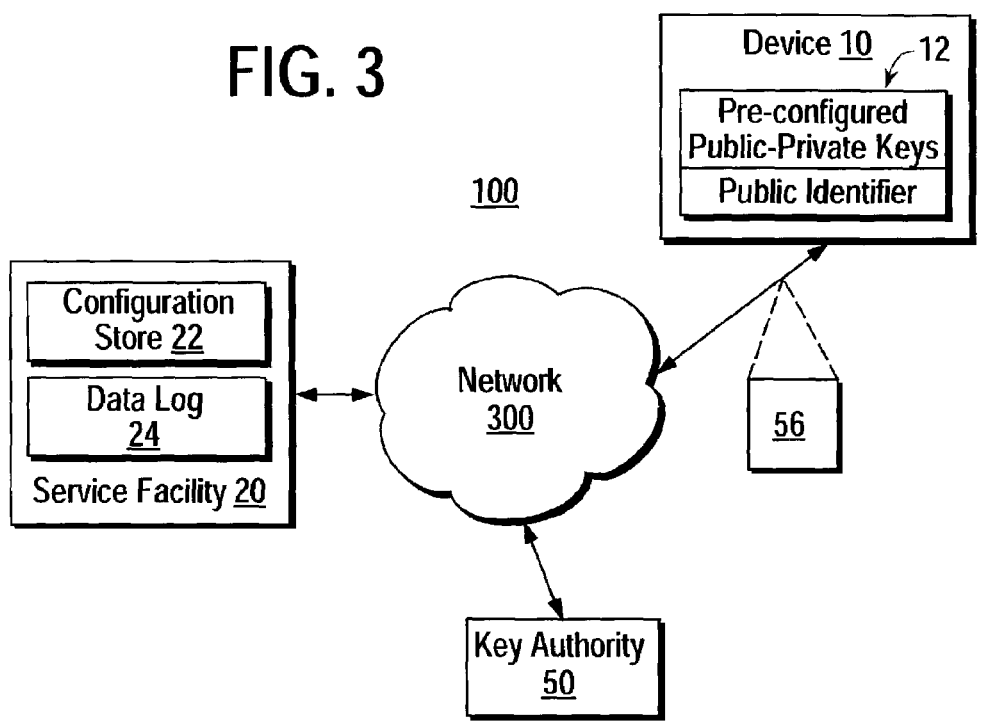
FIG. 3 shows a system according to the present techniques which employs public-private key encryption.

FIG. 3 shows an embodiment of the system 100 which employs public-private key encryption. In this embodiment, the persistent memory 12 holds a preconfigured security key that includes a public key along with a private key. Once connected to the network 300, the device 10 generates an authentication message 56 that includes the public key from the persistent memory in clear text and that may include other information which is encoded using the private key from the persistent memory.

The service facility 20 obtains the authentication message 56 via the network 300 and uses the public key for the device 10 to verify the authenticity of the device 10. For example, the device 10 may digitally sign the authentication message 56 using the private key from the persistent memory 12 and the service facility 20 verifies the digital signature using the public key for the device 10 which may be carried in the authentication message 56.

Alternatively, the service facility 20 may obtain the public key for the device 10 from a key authority 50. The key authority 50 may issue a digital certificate to the service facility 20 that certifies the public key with respect to the device 10.

Figure 4:
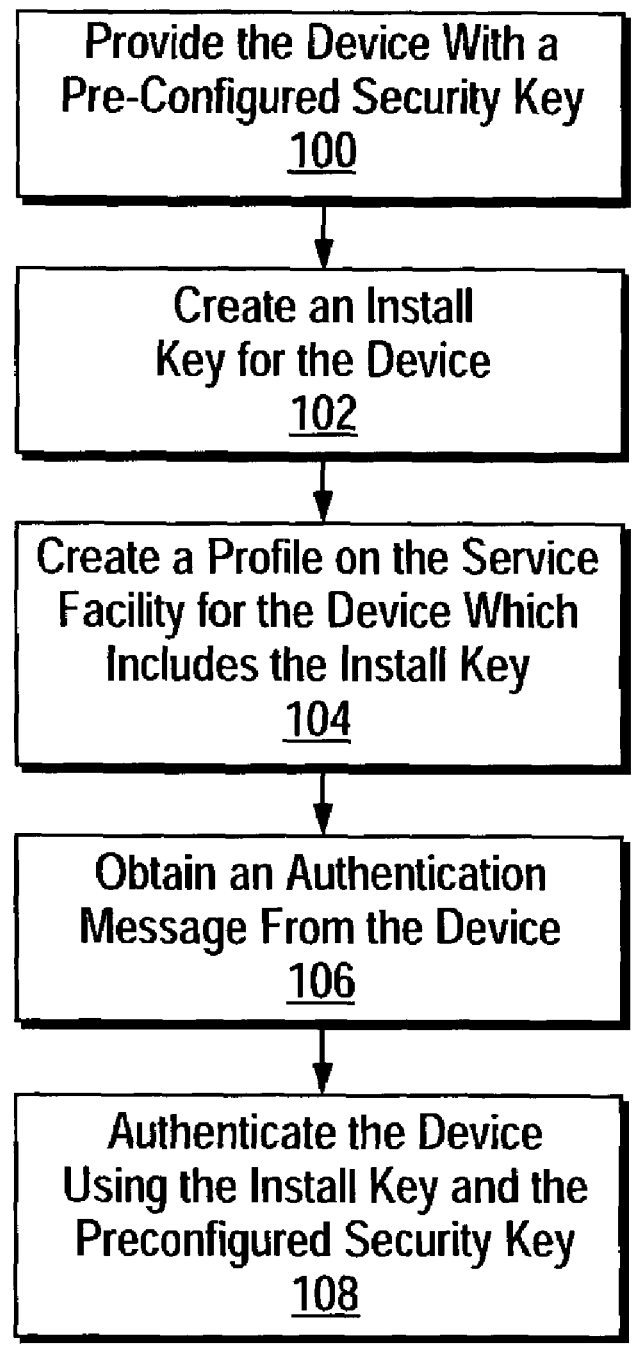
FIG. 4 shows a method for authenticating a device according to the present techniques.

FIG. 4 shows a method for authenticating the device 10 according to the present techniques. At step 100, a pre-configured security key is provided to the device 10. The pre-configured security key may be programmed into the device 10 by its manufacturer or a third party—for example a data logging service associated with the service facility 20 that resells the device 10. The pre-configured security key programmed into the device 10 at step 100 may be a private key or a public key/private key pair.

At step 102, an install key for the device 10 is created. The install key may be created, for example, by encrypting a public identifier of the device 10 with the private key from step 100. The install key may be created by the manufacturer of the device 10 or by a third party. The install key may be programmed into a persistent memory in the device 10. The install key may be affixed to the device 10 using, for example, a sticker. A sticker may include a bar code which enables reading of install keys for large numbers of devices.

At step 104, a user/owner of the device 10 creates a profile of the device 10 on the service facility 20. When creating the profile, the user/owner of the device 10 enters the install key for the device 10 into the profile on the service facility 20. For example, the user/owner may have selected the service facility 20 to be used as a data logging service for measurements obtained by the device 10. The user/owner may activate the data logging service by creating a profile on the service facility 20 for the device 10 and providing the install key as part of the profile. The profile may be stored, for example, in the configuration store 22.

The service facility 20 may extract the plaintext public identifier of the device 10 from the install key using the private key of the device 10 because the install key was created using that private key. The service facility 20 may obtain the private key of the device 10 from a key authority such as the manufacturer or provider of the device 10.

Alternatively, the service facility 20 may extract the plain-text public identifier of the device 10 from the install key using the public key of the device 10. The service facility 20 may obtain the public key of the device 10 from a key authority or from the device 10 itself at step 106.

At step 106, the service facility 20 obtains an authentication message from the device 10. This may occur when the device 10 performs its initial contact with the service facility 20. The authentication message includes the public identifier of the device 10 in plain-text format along with other information such as the install key of the device 10. In response, the service facility 20 locates the profile of the device 10 which was created by the user at step 104. In an embodiment which uses a public key, the service facility 20 may obtain the public key of the device 10 at this time from either the device 10 or a key authority.

At step 108, the service facility 20 authenticates the device 10 as belonging to the user/owner of step 104 by validating the install key carried in the authentication message from the device 10. For example, if the install key is encrypted then the service facility 20 may decrypt it and compares it to the install key contained in the profile created at step 104. A match indicates an authentic device with respect to the user/owner that created the profile of the device 10. The install key may be decrypted using the private key or the public key of the device 10 depending on the particular type of encryption system employed.

The service facility 20 may perform additional dialogs by exchanging messages with the device 10 to verify that the device 10 does contain the pre-configured security key provided at step 100. This prevents a party from obtaining the public identifier and the install key of the device 10 and trying to in effect impersonate the device 10 to the service facility 20.

In some embodiments, a device may optionally have an internal GPS receiver for assisting with a custom configuration based on location.

In some embodiments, the service facility 20 validates the public key obtained from the device 10 by requiring the device 10 to present a certificate signed by a trusted certificate authority.

The present techniques enable the deployment of a very large number of devices which use the services of a web server connected to the open Internet. The devices once deployed automatically generate data and obtain configuration with little or no intervention by the user/owners.

The present techniques enable devices to be purchased without any custom configuration requiring trained installation personnel. The devices may be attach to a network to automatically obtain authentication and configuration based on the identity of the owner of the devices. Consider an example in which user A and user B both have accounts on the service facility 20. The service facility 20 may distinguish between the devices of user A and the devices of user B by looking up the install keys of the devices. The service facility 20 may redirect a device attempting to initiate contact to another service facility. Alternatively, the service facility 20 may act as an agent for user A and user B and provide configuration and data storage directly.

The present techniques enable all communications to and from a device to be encrypted and authenticated, including installation and configuration. The present techniques enable an service facility to authenticate a device and avoid installation "spoofing." Ownership, and therefore control, of measurements devices may be determined automatically using the present techniques. The present techniques enable an automatic installation of a device given only its install key and enables an association with a user/owner of the device at a later time.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A system, comprising:
  device having a persistent memory that stores an install key generated by encrypting a public identifier for the device using a security key for the device, the device generating an authentication message that carries the install key and that also carries the public identifier;
  service facility that authenticates the device by using the public identifier carried in the authentication message to obtain the security key from a configuration store and that verifies the install key using the security key obtained from the configuration store.

2. The system of claim 1, wherein the security key is stored in the device.

3. The system of claim 2, wherein the security key is used in secure communication between the service facility and the device.

4. The system of claim 1, wherein the install key and the public identifier are stored in the persistent memory in the device.

5. The system of claim 1, wherein the service facility provides a data logging function for the device.

6. The system of claim 1, wherein the public identifier is a MAC address in the device.

7. The system of claim 1, wherein the device is a measurement device.

8. The system of claim 1, wherein the device is affixed with a visual depiction of the install key.

9. A method for authenticating a device, comprising:
  storing an install key in a persistent memory in the device such that the install key is a public identifier for the device encrypted with a security key for the device;
  generating an authentication message that carries the install key and that also carries the public identifier;
  obtaining the security key from a configuration store in response to the public identifier carried in the authentication message;
  verifying the install key carried in the authentication message using the security key obtained from the configuration store.

10. The method of claim 9, further comprising storing the security key in the persistent memory.

11. The method of claim 10, further comprising performing secure communication between the device and a service facility using the security key.

12. The method of claim 9, wherein the public identifier is a MAC address in the device.

13. The method of claim 9, wherein the device is a measurement device.

14. The method of claim 9, further comprising affixing a visual depiction of the install key onto the device.

15. A device having a persistent memory that holds an install key for the device wherein the install key is a public identifier for the device encrypted with a security key for the device, the device generating an authentication message that carries the install key and that also carries the public identifier such that the device is authenticated by using the public identifier carried in the authentication message to obtain the security key from a configuration store and verifying the install key using the security key obtained from the configuration store.

16. The device of claim 15, wherein the security key is stored in the device.

17. The device of claim 16, wherein the security key is used in secure communication between a service facility and the device.

18. The device of claim 15, wherein the public identifier and the install key are stored in the persistent memory.

19. The device of claim 15, wherein the public identifier is a MAC address in the device.

20. The device of claim 15, wherein the device is a measurement device.

21. The device of claim 15, further comprising an affixed visual depiction of the install key.

* * * * *